(12) United States Patent
Baumann et al.

(10) Patent No.: US 10,019,322 B2
(45) Date of Patent: Jul. 10, 2018

(54) TEMPLATE-BASED REMOTE/LOCAL FILE SELECTION TECHNIQUES FOR MODULAR BACKUP AND MIGRATION

(71) Applicant: INTERNATIONAL BUSINESS MACHINES CORPORATION, Armonk, NY (US)

(72) Inventors: Warren J. Baumann, Monroe, NY (US); Firas Bouz, Lexington, KY (US); Douglas S. Brown, Charlotte, NC (US); Wesley Stevens, Nicholasville, KY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 23 days.

(21) Appl. No.: 14/301,926

(22) Filed: Jun. 11, 2014

(65) Prior Publication Data

US 2014/0297593 A1    Oct. 2, 2014

Related U.S. Application Data

(63) Continuation of application No. 12/044,188, filed on Mar. 7, 2008, now abandoned.

(51) Int. Cl.
*G06F 17/30* (2006.01)
*G06F 11/14* (2006.01)

(52) U.S. Cl.
CPC ...... *G06F 11/1458* (2013.01); *G06F 11/1451* (2013.01); *G06F 11/1464* (2013.01);
(Continued)

(58) Field of Classification Search
CPC .......................... G06F 17/303; G06F 11/1458
See application file for complete search history.

(56) References Cited

U.S. PATENT DOCUMENTS

| 5,649,205 A | 7/1997 | Martins |
| 7,139,762 B2 | 11/2006 | Labarge et al. |

(Continued)

OTHER PUBLICATIONS

"Reference Guide:Data Migration using File Rules", Tranxition, Beaverton OR, Nov. 29, 2005.

(Continued)

*Primary Examiner* — Neveen Abel Jalil
*Assistant Examiner* — Dawaune Conyers
(74) *Attorney, Agent, or Firm* — Mitch Harris, Atty at Law, LLC; Andrew M. Harris; John R. Pivnichny (57) ABSTRACT

File selection techniques that can handle overlapping module contexts provide flexible and reversible backup, restore, migration, deployment and synchronization operations. Both remote (administrative) control and local (user) control of the file selection are provided. Application and configuration specific templates are provided to a user from the remote administrator for further customization by selecting or de-selecting configurations, applications and/or individual files or configuration entries. The templates may be controlled geographically by the IP address or identity associated with the user. A user's interaction with the customization is saved and the order of changes is maintained, so that when the templates are updated, the user's customizations can be re-applied. The administrator may override user settings based on rules, which may also be geographically determined. The file selection may also be altered based on media type and location, e.g., local backup vs. server backup.

18 Claims, 6 Drawing Sheets

(52) U.S. Cl.
CPC .... *G06F 17/3007* (2013.01); *G06F 17/30126* (2013.01); *G06F 17/30176* (2013.01)

(56) References Cited

U.S. PATENT DOCUMENTS

| | | |
|---|---|---|
| 2001/0034795 A1* | 10/2001 | Moulton et al. ............... 709/244 |
| 2005/0091346 A1* | 4/2005 | Krishnaswami et al. .... 709/220 |
| 2005/0223277 A1* | 10/2005 | Ballard ............................. 714/15 |
| 2006/0117309 A1* | 6/2006 | Singhal et al. ................. 717/162 |
| 2006/0173892 A1* | 8/2006 | Beck ........................ H04L 69/18 |
| | | 707/102 |
| 2006/0265458 A1 | 11/2006 | Aldrich et al. |
| 2007/0067278 A1 | 5/2007 | Borodziewicz et al. |
| 2009/0228531 A1 | 9/2009 | Baumann et al. |

OTHER PUBLICATIONS

Office Action in U.S. Appl. No. 12/044,188 dated Jul. 19, 2010, pp. 1-19 (19 pages in pdf).
Final Office Action in U.S. Appl. No. 12/044,188 dated Dec. 20, 2010, pp. 1-24 (24 pages in pdf).
Decision on Appeal in U.S. Appl. No. 12/044,188 dated Apr. 11, 2014, pp. 1-15 (15 pages in pdf).

* cited by examiner

TEMPLATE-BASED REMOTE/LOCAL FILE SELECTION TECHNIQUES FOR MODULAR BACKUP AND MIGRATION

The present application is a Continuation of U.S. patent application Ser. No. 12/044,188, filed on Mar. 7, 2008 and claims priority thereto under 35 U.S.C. § 120. The disclosure of the above-referenced parent U.S. patent application is incorporated herein by reference.

BACKGROUND OF THE INVENTION

1. Field of the Invention

The present invention is related to computer management software, and more particularly to template-based file selection techniques providing remote/local file selection for modular backup and migration.

2. Description of Related Art

Application and operating system backup and migration tools, as well as other tools such as synchronization mechanisms provide file selection interfaces for selecting sets of files and configuration entries for backup, restore, synchronization, deployment and migration of applications and system components. On a workstation level, a user or administrator typically selects or de-selects directory tree levels and/or individual files to include in a backup, migration or synchronization session. The configuration is typically saved at the location of the backup program, whether located at a central local-area network backup point, or on the individual workstation. More recent systems have the ability to backup/migrate configuration information such as configuration files and registry entries. Upon restore, backup algorithms generally offer the option to deselect files that are contained in a backup, so that some files contained on the back are not over-written.

Applications generally have large numbers of files and configuration entries that make it difficult for a user or administrator to select just the files associated with an application. Further, the particular files and the names of files associated with an application typically varies from version to version of an application. It would be desirable for an administrator or end user to easily select files associated with an application, in order to accomplish the above-listed tasks without having to generate a list of files themselves, which in some cases is a tedious and time-consuming task requiring a high level of skill and often a large amount of trial-and-error or sophisticated analysis. Further, the typical backup or system configuration strategy is either controlled by an administrator or the local user, but not both, even though it would be desirable to provide end-user controlled file selection while receiving some automatic protection and assistance from the administrative level.

Further, present administrative backup and deployment systems typically have a uniform behavior with respect to workstation backup and deployment of software, while differing geographical or user needs may dictate differences requiring adjustment for individual workstations or users. Also, depending on the destination of a backup, certain files may be desirable for backup, while other may not be, such as when a large number or large-sized personal files of a user are present on a system and backup is not needed for ensuring continuity of business operations. In such circumstances, it would be desirable to provide the user a flexible and friendly backup environment, while ensuring that such files do not waste valuable server resources.

BRIEF SUMMARY OF THE INVENTION

The invention is embodied in a computer-performed method, computer program product and computer system that provides file selection for backup, deployment, migration, restore and synchronization based on application-associated templates. Upon starting a backup, deployment, migration, restore or synchronization task, or upon generating an initial profile to be used repeatedly for such a task, the user is presented with a selection between pre-configured modules that can be selected or de-selected from templates to provide a file selection profile. The modules may be application level modules, or full configuration modules representing one of a number of pre-determined configurations that generally include multiple applications. The user may further customize the file selection not only by selecting/de-selecting configuration(s) and/or applications, but by selecting and de-selecting individual file tree levels/directories and files, along with individual configuration entries to generate a user/workstation specific file selection profile.

Multi-point and updateable file selection management can be provided by storing a user's customization of the file selection, including an order of customization operation, so that when an administrative update is made to the configuration, application or other selection templates, the customization can be applied to the updated templates to generate a new file selection profile. The templates are generally provided as feeds to the various workstations, and particular feed selection may be made based on geographic criteria, which may be IP address-based and/or user-based.

The file selection engine and file copying engine is provided also as a feed-delivered object, which may be a JAVA object (JAVA is a trademark of Sun Microsystems, Inc.) or other deliverable executable/interpretable engine. The file copying engine may be perform differently depending on the destination/source of the files, e.g., if the destination/source is a backup server, certain files may be excluded from the backup or vice-versa, whereas if the destination/source is local media, a different filter criteria (or no filtering) may be employed.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

DETAILED DESCRIPTION OF THE INVENTION

The present invention relates to file selection techniques that are applied to backup, migration, synchronization, deployment and other forms of file transfer between systems. The file selection techniques of the present invention provide for pre-defined templates that generally combine sets of files and configuration entries associated by application, but also provide for user-defined templates that combine the sets of application-associated files without requiring use of a pre-defined template. The user is permitted to modify the file selection specified by the template or user-defined set of application files, by selecting or de-selecting individual directories or files in addition to, or to be removed from the file selection specified by the template. The user may also specify particular file types (e.g., by MIME type or extension) for inclusion in or exclusion from the backup. The geographic location of the workstation, IP address, user identity, user group membership, workstation identity or other identifier associated with a user or the workstation may be used to determine one or more templates fed to the a workstation via an RSS feed or other transfer mechanism. The user's interaction with or definition of the current template is stored as a set of changes, which are ordered according to the order of entry. As templates are updated, which is generally accomplished by a differential update object, the stored changes are applied to the updated template, so that user-customization is preserved. Both attended and unattended backups and other processes may be supported by the techniques of the present invention, with the last version of a customized template used when performing automatic backups or other transfers.

Administrative override rules, which are also generally provided by an RSS feed or other transfer mechanism, may be applied to the final list of files selected by the above-described process to force the inclusion or exclusion of specific file, directories and/or file types. The specific administrative override rules applied may also be selected according to the geographic location of the workstation, IP address, user identity, user group membership, workstation identity or other identifier associated with a user or the workstation and may also be varied or omitted depending on the destination of the file transfer. For example, if a user is generating a local backup to removable media, user selection or de-selection of any file for backup may be permitted, whereas certain file types or specific files and directories may be omitted from the file list according to administrative rules if the backup destination is remote storage managed by a server in order to reduce storage and bandwidth requirements, and to meet internal administrative standards. Certain file types and/or directories may also be required in the file transfer list if the backup destination is remote storage, so that a minimum level of accepted backup is maintained. The user may be presented with a final list of selected files and directories as modified by the administrative rules, as a display or user-interface inviting further modification, or the application of administrative overrides may be automatic and the resultant file/directory list might not be displayed to the user.

Figure 1:
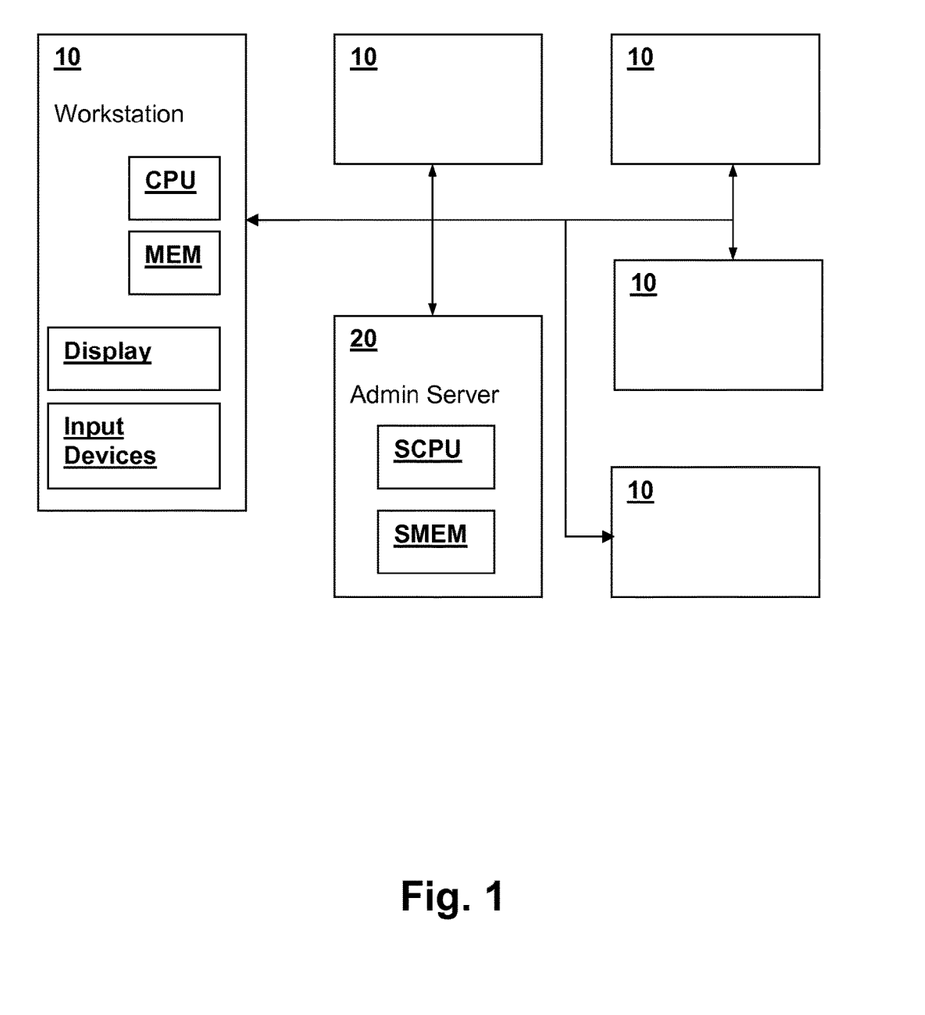
FIG. 1 is a block diagram illustrating a networked computer system in which techniques according to an embodiment of the present invention are practiced.

Referring now to FIG. 1, a networked computer system in which an embodiment of the present invention is practiced is depicted in a block diagram. An administrative server 20 includes a server processor SCPU coupled to a server memory SMEM that contains program instructions for implementing a portion of a system in accordance with an embodiment of the present invention and forming a computer-program product in accordance with another embodiment of the present invention. Administrative server 20 is coupled to a number of workstation computers 10, which in the depicted embodiment each include a workstation processor CPU coupled to a workstation memory MEM that contains program instructions for implementing another portion of the system and forming a computer-program product in accordance with another embodiment of the present invention. Workstation computers 10 are also depicted as including a graphical display Display and input devices Input Devices, such as mice and keyboards, for interacting with a user interface as described in further detail below. Workstation computers 10 are coupled to administrative server 20 over network, which may include wireless local area networks (WLANs), wired local-area networks (LANs), wide-area networks (WANs) or any other suitable interconnection that provides communication between administrative server 20 and workstation computers 10. Further, the present invention concerns file selection and transfer techniques that are not limited to a specific computer system configuration or requiring a network at all, as some embodiments of the present invention are applicable to individual computer systems, and the network-informed embodiments of the present invention retain some functionality even in off-line configurations, such as when generating a local backup at a workstation 10 based on templates provided from administrative server 20. Finally, the specification of an administrative server 20 and workstation 10 and the location of their specific memories MEM and SMEM does not imply a specific client-server relationship or hierarchical organization, as the techniques of the present invention may be employed in distributed systems in which the administrative role, if employed at all, is defined by an identity and control privilege, rather than by association with a particular location or hardware type.

Figure 2:
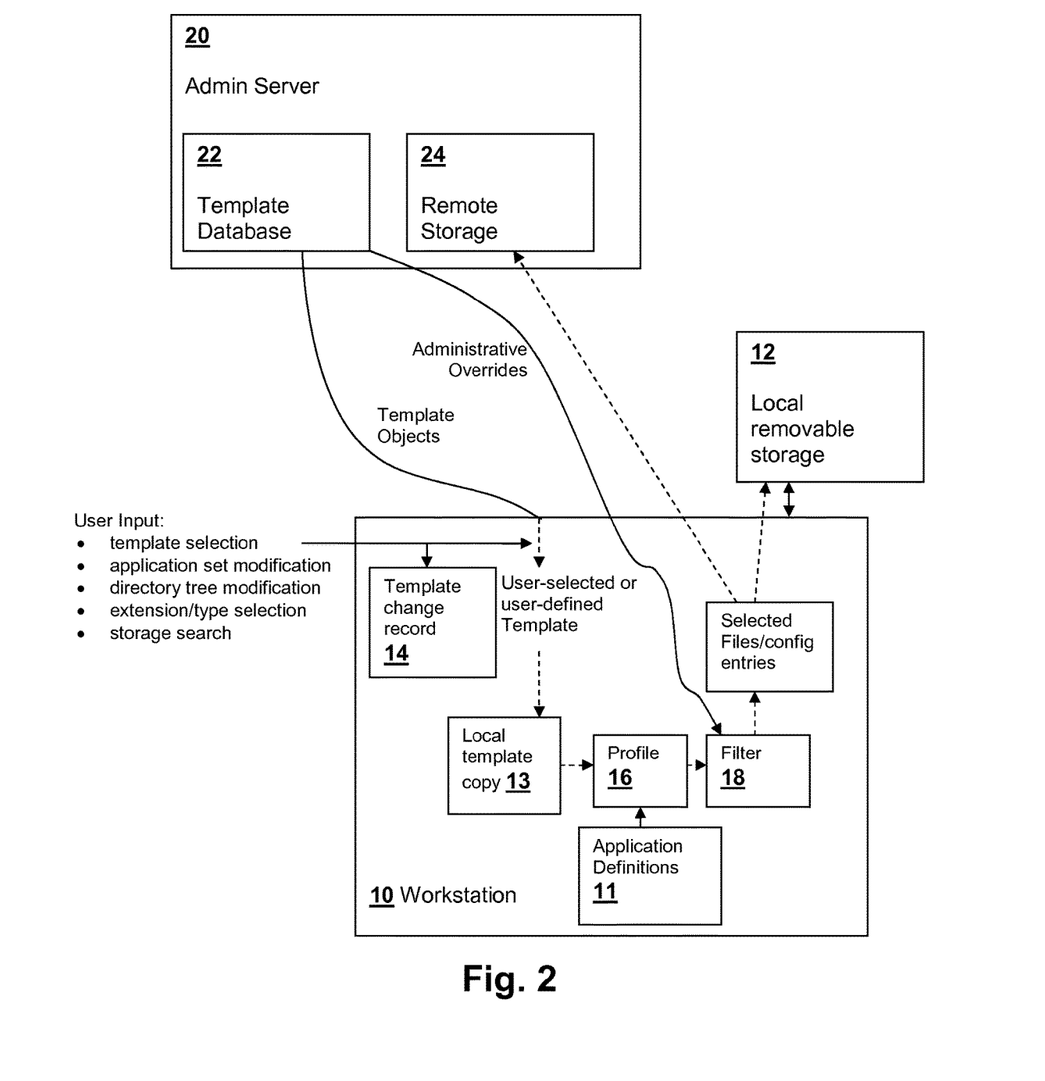
FIG. 2 is an organizational and flow diagram of a file selection and transfer process within the system of FIG. 1.

Referring now to FIG. 2, an organization and information flow within the system of FIG. 1 is illustrated. Administrative server 20 includes a template database 22 from which template objects are transferred to workstation computer 10 via RSS feeds or another transfer technique. The specific template object or objects provided to workstation computer 10 may be determined in conformity with the geographic location of the workstation, IP address, user identity, user group membership, workstation identity or other identifier associated with a user or workstation computer 10. Alternatively, all template objects may be made available for user-selection, or all template objects may be downloaded and selection made by user identity determined by the user's login profile, group membership or privilege level. The template objects also include application definitions, from which the template objects build file selection profiles, as the template objects generally specify collections of applications and other files, and the application file and configuration entry selections are more easily maintained as separate objects. One of the template objects is selected either by one of the above-described identification processes, or by the user via input provided to a user interface. A "blank" template is also provided for generating a user-defined template. The user is provided with control of the selection of applications included in the template, modification of the directories and files selected by the template via a tree control or other mechanism, selection/de-selection of particular file types by MIME type or file extension. The user is also provided with the ability to search for files for selection, such as by text string, filenames with wildcards, and other file search mechanisms as commonly known in the art. While objects are used in the exemplary embodiment to implement templates and other features such as application definitions, it is not necessary to use object-oriented programming to implement any of the techniques of the present invention. Templates, application definitions and other features of the present invention such as administrative overrides can alternatively be provided as XML files containing data fields or rules that may or may not be associated with methods. Further the above-mentioned data structures may be provided as simple textual or binary data files or database objects which are read and operated on using separately packaged program code.

Any user input that modifies the template is applied to the template to generate a local template copy 13, which is used along with the associated selected application definitions 11 to generate a profile 16 that specifies the files to transfer. Application definitions 11 are also objects provided by and maintained via feeds from administrative server 20, but as described above, application definitions 11 may be implemented as other forms of data. The user input is also recorded to a template change record 14, which provides local storage of the manner and order in which the user applied modifications to a pre-defined template or defined a user-defined template. Template change record 14 is used to preserve user-customization of the file selection, so that when templates are updated, the user's changes can be reapplied as described in further detail below. Once profile 16 is built, administrative overrides, which are supplied as RSS feeds from administrative server 20 are applied to a filter process 18 that changes the file selection in accordance with administrative requirements. While RSS feeds are used in the exemplary embodiment to transfer objects and data between workstation computers 10 from administrative processes, other feed techniques or transfer techniques may be employed, including local software installation from distribution media. While objects are used in the exemplary embodiment to implement templates and other features such as application definitions, it is not necessary to use object-oriented programming to implement any of the techniques of the present invention. Templates, application definitions and other features of the present invention such as administrative overrides can alternatively be provided as XML files containing data fields or rules that may or may not be associated with methods. Further the above-mentioned data structures may be provided as simple textual or binary data files or database objects which are read and operated on using separately packaged program code. Filter process 18 may also be responsive to the destination of the file transfer as described above. Illustrated transfer destinations are remote storage 24 managed by administrative server 20 or local removable storage 12, which may be a USB FLASH drive, recordable optical media or other storage type. Other storage locations may be managed by the present invention and the illustrated storage options are exemplary only, and are not intended to limit the types or location of storage that may be employed in embodiments of the present invention. Once the selected files and configuration entries are determined, the actual files and configurations are transferred to their destination, e.g., local removable storage 12 or remote storage 24.

Figure 3:
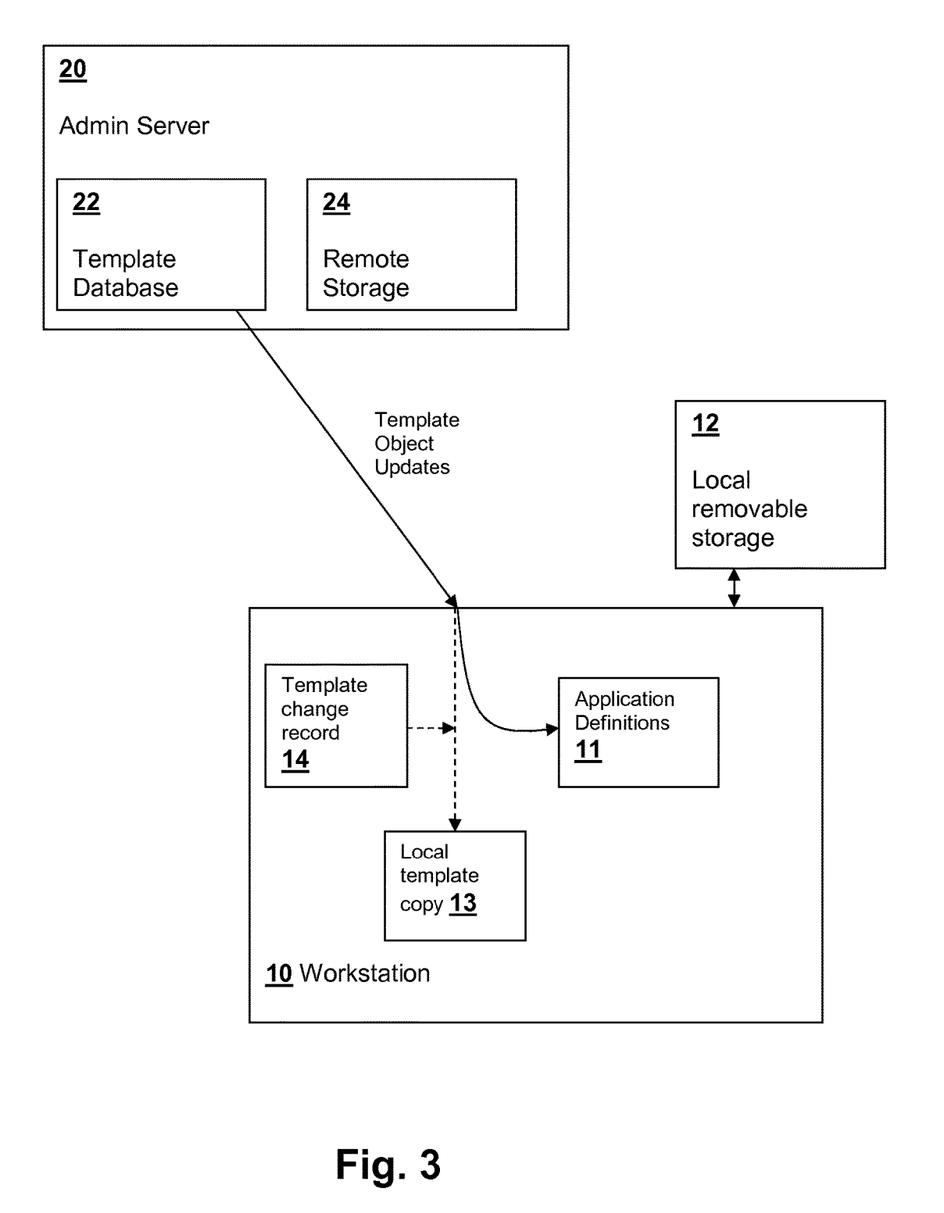
FIG. 3 is an organizational and flow diagram of a template update process within the system of FIG. 1.

Referring now to FIG. 3, another organization and information flow within the system of FIG. 1 is illustrated. When a template and/or application definition is updated, a differential update object is fed from administrative server 20 to workstation computer 10. If the update includes only application definition objects, application definitions 11 are overwritten with the updated versions. However, when a template object is updated (to add/remove applications or specific directories or files), then the latest template change record 14 is retrieved and applied in the stored order of user entry, to modify the updated template. The resulting template is stored as local template copy 13. Changes from template change record are applied after the differential update to the corresponding template object is accomplished. The template objects and application definitions described above are implemented as XML (extensible markup language) objects, so that generation of rules and differential updates are easily effected. However, other types of data/program code implementations are usable to implement the same functionality, and are contemplated as alternatives that fall within the scope of the present invention.

Figure 4:
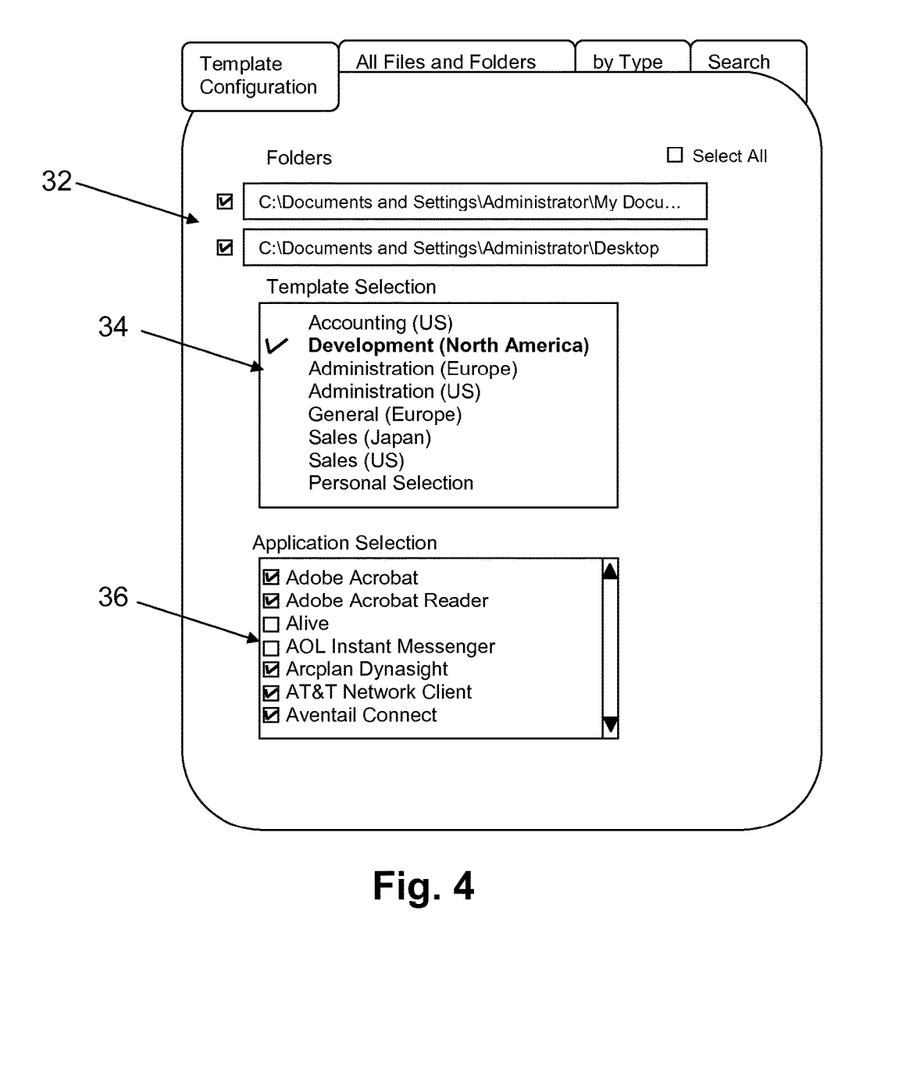
FIG. 4 is a pictorial diagram depicting a property page of a user interface for controlling a template and application selection process in accordance with an embodiment of the present invention.

Referring now to FIG. 4, a user interface screen for providing user input to controlling a template and application selection process in accordance with an embodiment of the invention is shown. The depicted display shows a set of property pages, with the active page displaying an application and template selection page. Other property pages include the above-described file/folder selection, file type selection and search user inputs, which are implemented as known in the art. However, in order to control the file selection process of the present invention, it is necessary to provide for additional user input. Such user input is provided by a template selection menu 34, from which predetermined templates are selectable. Generally, a single template is selected for each workstation, but multiple template embodiments are possible, with merger of modular application group selections, for example. A "user_defined" option is selected, in which no applications or other files/configuration items are initially selected (or a mandatory base configuration can be used as an alternative to a "blank" template). The selectable templates may be restricted by the geographical or other workstation/user identifiers as described above, which may be effected by displaying only a set of template objects that were downloaded to the corresponding workstation based on workstation/user identification. Template selection menu 34 may be omitted if template selection is made automatically, e.g., in implementations where a single template is downloaded per workstation. A user-defined template option can then be selected with a single checkbox that disables/enables use of the predetermined template.

An application selection menu 36 provides for either modification of a pre-selected set of applications specified by the selected predetermined template (or the modified local template after the user input has modified the template) or generation of a user-defined template, which will generally start with no applications selected. Although selection of an entry in application selection menu 36 will specify certain files for backup or other file transfer, the user may modify the set of files using the other available property page tabs, as well as by selecting particular other folders specified in predetermined template folders fields 32. The folders/directory paths specified in template folders fields 32 are generally common paths for backup/migration/synchronization for any user, such as the default documents folder and the desktop folder. An "ADD" and/or "REMOVE" button can be included to change the template folders fields 32, but since other folder paths can be included in the file selection via the "All Files and Folders" property sheet, and the predetermined template folders fields 32 can be de-selected, such functionality is not needed on the template and application selection page. Therefore, in the depicted embodiment, the folders specified by the selected predetermined template are shown as static members.

Figure 5:
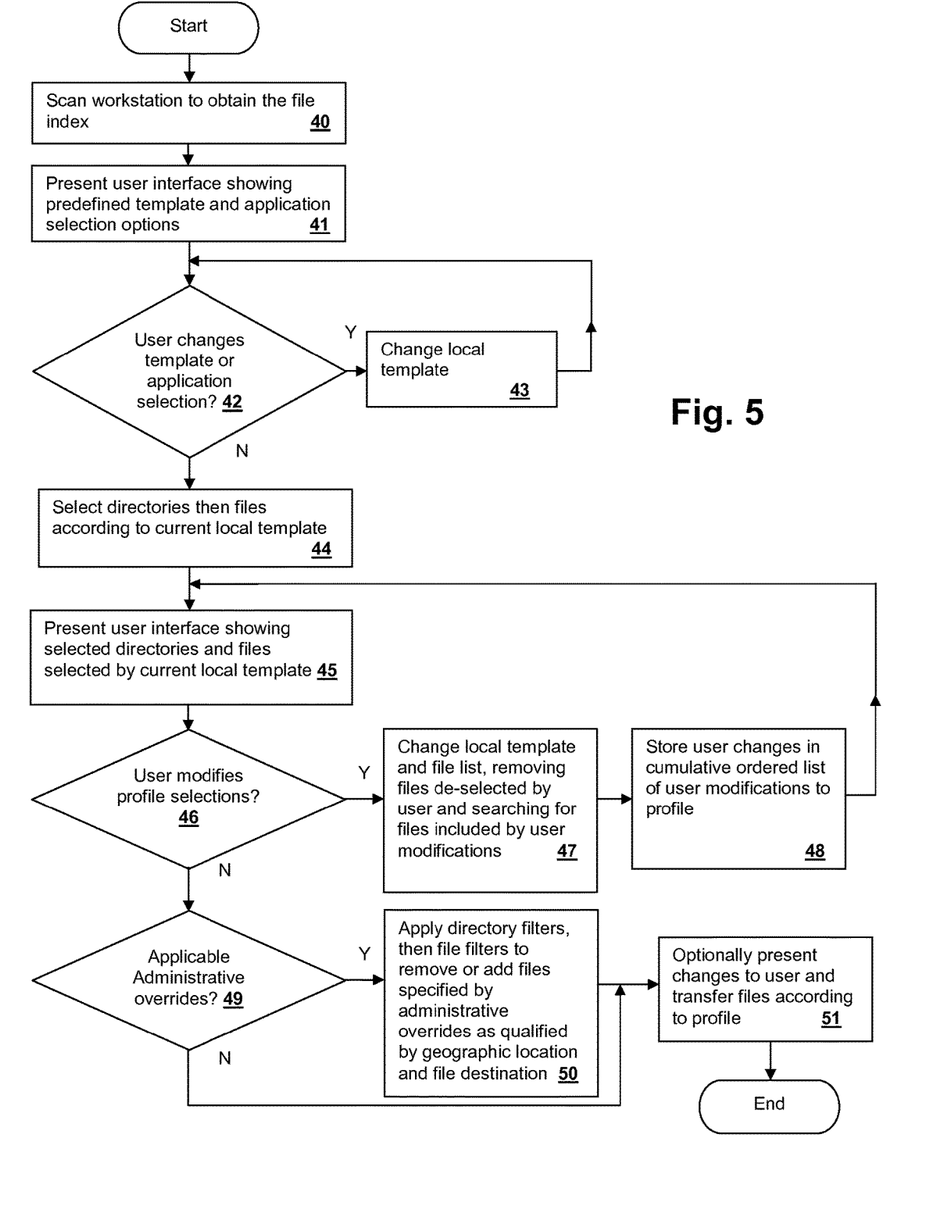
FIG. 5 is a flow chart of a file selection method in accordance with an embodiment of the present invention.

Referring now to FIG. 5, a file selection method in accordance with an embodiment of the present invention is depicted in a flowchart. First, the workstation is scanned to obtain a file index (step 40) and a user interface is presented showing the predefined template and application selection options (step 41). If the user changes the template or application selections (step 42), then the local template is changed (step 43). Next, directories and then files are selected according to the current local template (step 44). In each of the above described file and directory selection modification techniques, consistency must be maintained with respect to application of directory and file selection order. In particular, selection of directories is performed first, with selection/de-selection of individual files performed second. Since selection/de-selection of a directory potentially impacts the selection status of all of the files in the directory, the directory operation must be performed first to avoid undoing individual file selections/de-selections. Next a user interface is displayed showing selected directories and files according to the current local template (step 45). While step 45 is described in a linear sense with respect to the flowchart, it is understood that the user may be required to activate a particular property page or menu item, such as the "All Files and Folders" property tab of FIG. 4, in order to view the actual files and folders selected by the local template. Therefore, if a user wishes only to select particular applications, or to apply a particular or default template without modifying files or directory paths specified thereby, it is not necessary to interact with the file/folder selection/de-selection interface at all.

Next, if the user modifies the selections (decision 46) the local template is further modified and the file list is also modified removing entries that were de-selected and searching for entries added by the user modifications (step 47). At this point user changes to the template are stored in a cumulative ordered list, so that the user-customization is preserved for application to later updated templates (step 48). Next, any administrative overrides (decision 49) are applied to the file list (step 50), and as mentioned above, administrative overrides can be conditionally applied based on workstation/user identifiers and/or the destination or media type of the file transfer. Finally, the final selections may be displayed and the user may be prompted to make any further changes, or the transfer may proceed without user intervention (step 51).

Figure 6:
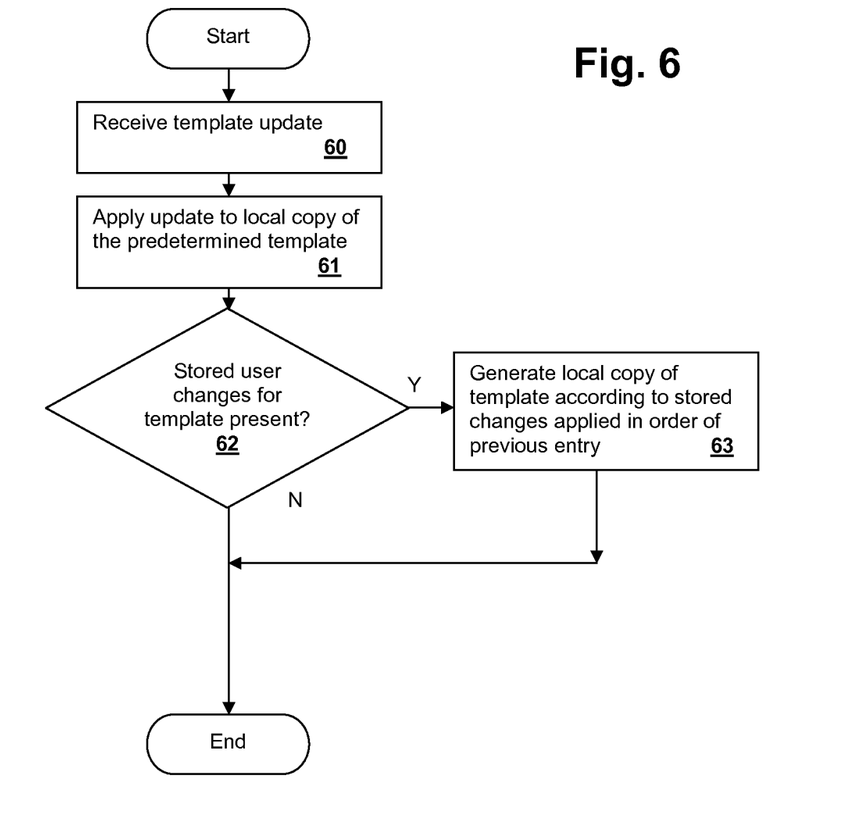
FIG. 6 is a flow chart of a template update method in accordance with an embodiment of the present invention.

Referring now to FIG. 6, a template update method in accordance with an embodiment of the present invention is depicted in a flowchart. When a template update is received (step 60), the update is applied to a local copy of the predetermined template (step 61). (The local copy of the predetermined template is not the user-modified local template, but the predefined starting-point template.) If stored user changes are present for the template (step 62), then the local copy of the template, i.e., the user-modified template, is generated by applying the stored changes to the updated template from step 61 in the original order in which the user made the changes to the predetermined template prior to the update (step 63). As mentioned above, preserving the order is necessary to ensure consistent results in applying the stored user input.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A computer program product comprising a computer-readable, tangible storage device and computer-readable program instructions stored on the computer-readable, tangible storage device to perform backup or migration of files, the program instructions comprising an application for execution within a workstation computer system that:

scan the workstation computer system to obtain a file index;

present a user interface having a display showing predefined template and application selection options;

first receive a first user input from the display selecting a first template specifying a first predetermined set of files for backup or migration;

responsive to the receiving the first user input, first load the first template;

second receive a plurality of second user inputs from the user interface selecting one or more application programs and selecting or deselecting individual files for backup or migration;

store the plurality of second user inputs as an ordered sequence of modifications;

responsive to the receiving the plurality of second user inputs, second load application definitions for each of the selected application programs;

first build first file lists for each of the loaded application definitions;

first add files specified by the first file lists, second add the selected individual files to and remove the deselected files from the first predetermined set of files to obtain a second set of files by performing directory selection modifications in a first group of modifications and file selection modifications in a second subsequent group of operations;

first update the user interface display to reflect the second set of files;

first perform the backup or migration of the second set of files to a specified storage location;

subsequent to performing the directory selection modifications, the first update of the user interface display and first performing the backup or migration of the second set of files, receive an update to at least one of the application definitions;

subsequent to performing the directory selection modifications, the first update of the user interface display and first performing the backup or migration of the second set of files, third load a second template specifying a second predetermined set of files for backup or migration, wherein the second predetermined set of files differs from the first predetermined set of files;

responsive to third loading the second template, retrieve the stored ordered sequence of modifications;

responsive to retrieving the stored ordered sequence of modifications, second load application definitions for each of the selected application programs including the update to the at least one of the application definitions;

second build second file lists for each of the loaded application definitions including the update to the at least one of the application definitions;

second add files specified by the second file lists to the second predetermined set of files to obtain a third set of files by performing directory selection modifications in a third group of modifications and file selection modifications in a fourth subsequent group of operations;

update the user interface display to reflect the third set of files; and perform the backup or migration of the third set of files to the specified storage location.

2. The computer program product of claim 1, wherein the second template is an updated version of the first template, and further comprising program instructions that receive the second template as an update to the first template.

3. The computer program product of claim 2, wherein the first template and the second template are templates designating a department within an entity, and wherein the second template is an updated template designated for the department within the entity.

4. The computer program product of claim 1, further comprising program instructions that:
   receive an object separate from and having a higher priority than the application definitions, the first and second templates and the user input, wherein the object specifies rules; and
   apply the rules to the third set of files subsequent to the second adding whereby the third set of files reflected by the second updating and second performing is the third set of files modified by the applying the rules.

5. The computer program product of claim 4, wherein the rules contained are rules dependent on a geographic location of the workstation computer system and a media type of the specified storage location, and wherein the program instructions that apply the rules selectively apply the rules according to the geographic location of the workstation and a media type of the specified storage location.

6. The computer program product of claim 1, further comprising program instructions that automatically detect a media type or location of the storage location, and responsive to detecting the media type or location of the storage location, selectively include files in or exclude files from the second set of files in conformity with the detected media type or location of the specified storage location.

7. A computer-performed method for selecting files and/or configuration entries for backup or migration of files from a workstation computer system, the method comprising:
   an application executing in the workstation computer system scanning the workstation computer system to obtain a file index;
   the application executing in the workstation computer system presenting a user interface having a display showing predefined template and application selection options;
   the application executing in the workstation computer system first receiving a first user input from the display selecting a first template specifying a first predetermined set of files for backup or migration;
   responsive to the first receiving the first user input, the application executing in the workstation computer system first loading the first template;
   the application executing within the workstation computer system second receiving a plurality of second user inputs from the user interface selecting one or more application programs and selecting or deselecting individual files for backup or migration;
   the application executing within the workstation computer system storing the plurality of second user inputs as an ordered sequence of modifications;
   responsive to the second receiving the plurality of second user inputs, the application executing within the workstation computer system second loading application definitions for each of the selected application programs;
   the application executing within the workstation computer system first building first file lists for each of the loaded application definitions;
   the application executing within the workstation computer system first adding files specified by the first file lists, second adding the selected individual files to and removing the deselected files from the first predetermined set of files to obtain a second set of files by performing directory selection modifications in a first group of modifications and file selection modifications in a second subsequent group of operations;
   the application executing within the workstation computer system first updating the user interface display to reflect the second set of files;
   the application executing within the workstation computer system first performing the backup or migration of the second set of files to a specified storage location;
   subsequent to the first modifying, the updating and the performing, the application executing within the workstation computer system receiving an update to at least one of the application definitions;
   subsequent to the first modifying, the updating and the performing, the application executing within the workstation computer system third loading a second template specifying a second predetermined set of files for backup or migration, wherein the second predetermined set of files differs from the first predetermined set of files;
   responsive to the third loading the second template, the application executing within the workstation computer system retrieving the ordered sequence of modifications stored by the storing;
   responsive to the retrieving the ordered sequence of modifications stored by the storing, the application executing within the workstation computer system second loading application definitions for each of the selected application programs including the update to the at least one of the application definitions;
   the application executing within the workstation computer system second building second file lists for each of the loaded application definitions including the update to the at least one of the application definitions;
   the application executing within the workstation computer system second adding files specified by the second file lists to the second predetermined set of files to obtain a third set of files by performing directory selection modifications in a third group of modifications and file selection modifications in a fourth subsequent group of operations;
   the application executing within the workstation computer system second updating the user interface display to reflect the third set of files; and
   the application executing within the workstation computer system second performing the backup or migration of the third set of files to the specified storage location.

8. The computer-performed method of claim 7, wherein the second template is an updated version of the first template, and wherein the method further comprises receiving the second template as an update to the first template.

9. The computer-performed method of claim 8, wherein the first template and the second template are templates designating a department within an entity, and wherein the second template is an updated template designated for the department within the entity.

10. The computer-performed method of claim 7, further comprising:

the application executing within the workstation computer system receiving an object separate from and having a higher priority than the application definitions, the first and second templates and the user input, wherein the object specifies rules; and the application executing within the workstation computer system applying the rules to the third set of files subsequent to the second adding whereby the third set of files reflected by the second updating and second performing is the third set of files modified by the applying the rules.

11. The computer-performed method of claim 10, wherein the rules contained are rules dependent on a geographic location of the workstation computer system and a media type of the specified storage location, and wherein the applying the rules selectively applies the rules according to the geographic location of the workstation and a media type of the specified storage location.

12. The computer-performed method of claim 7, further comprising the application executing within the workstation computer system automatically detecting a media type or location of the storage location, and responsive to the automatically detecting, the application executing within the workstation computer system selectively including files in or excluding files from the second set of files in conformity with the detected media type or location of the specified storage location.

13. A computer system comprising:
a processor;
a computer-readable memory;
a computer-readable, tangible storage device; and
program instructions, stored on the storage device for execution by the processor via the memory, forming an application program for execution within the computer system that perform backup or migration of files that scan the workstation computer system to obtain a file index, present a user interface having a display showing predefined template and application selection options, first receive a first user input from the display selecting a first template specifying a first predetermined set of files for backup or migration, responsive to the receiving the first user input, first load the first template, second receive a plurality of second user inputs from the user interface selecting one or more application programs and selecting or deselecting individual files for backup or migration, store the plurality of second user inputs as an ordered sequence of modifications, responsive to the receiving the plurality of second user inputs, second load application definitions for each of the selected application programs, first build first file lists for each of the loaded application definitions, first add files specified by the first file lists, second add the selected individual files to and remove the deselected files from the first predetermined set of files to obtain a second set of files by performing directory selection modifications in a first group of modifications and file selection modifications in a second subsequent group of operations, first update the user interface display to reflect the second set of files, first perform the backup or migration of the second set of files to a specified storage location, subsequent to performing the directory selection modifications, the first update of the user interface display and first performing the backup or migration of the second set of files, receive an update to at least one of the application definitions, subsequent to performing the directory selection modifications, the first update of the user interface display and first performing the backup or migration of the second set of files, third load a second template specifying a second predetermined set of files for backup or migration, wherein the second predetermined set of files differs from the first predetermined set of files, responsive to third loading the second template, retrieve the stored ordered sequence of modifications, responsive to retrieving the stored ordered sequence of modifications, second load application definitions for each of the selected application programs including the update to the at least one of the application definitions, second build second file lists for each of the loaded application definitions including the update to the at least one of the application definitions, second add files specified by the second file lists to the second predetermined set of files to obtain a third set of files by performing directory selection modifications in a third group of modifications and file selection modifications in a fourth subsequent group of operations, update the user interface display to reflect the third set of files, and perform the backup or migration of the third set of files to the specified storage location.

14. The computer system of claim 13, wherein the second template is an updated version of the first template, and wherein the program instructions further comprise program instructions that receive the second template as an update to the first template.

15. The computer system of claim 14, wherein the first template and the second template are templates designating a department within an entity, and wherein the second template is an updated template designated for the department within the entity.

16. The computer system of claim 13, wherein the program instructions further comprise program instructions that receive an object separate from and having a higher priority than the application definitions, the first and second templates and the user input, wherein the object specifies rules, and apply the rules to the third set of files subsequent to the second adding whereby the third set of files reflected by the second updating and second performing is the third set of files modified by the applying the rules.

17. The computer program system of claim 16, wherein the rules contained are rules dependent on a geographic location of the workstation computer system and a media type of the specified storage location, and wherein the program instructions that apply the rules selectively apply the rules according to the geographic location of the workstation and a media type of the specified storage location.

18. The computer program product of claim 13, wherein the program instructions further comprise program instructions that automatically detect a media type or location of the storage location, and responsive to detecting the media type or location of the storage location, selectively include files in or exclude files from the second set of files in conformity with the detected media type or location of the specified storage location.

* * * * *